United States Patent Office 3,676,158
Patented July 11, 1972

3,676,158
METHOD OF FORMING AN ADHERENT COATING ON FOODS
Leonard G. Fischer, College Point, N.Y., and Philip Wong, Bergenfield, N.J., assignors to DCA Food Industries Inc.
No Drawing. Filed June 7, 1971, Ser. No. 150,799
Int. Cl. A23b *1/10, 7/16*
U.S. Cl. 99—166                                                11 Claims

ABSTRACT OF THE DISCLOSURE

A food product having a gel-forming material on its surface is exposed to a gelation agent thereby forming a continuous skin which envelops the food product. An excess of gelation agent is employed so that a residue is left on the skin. The skin-enveloped product is then coated with a fluid batter containing a gel-forming material. The residue gelation agent and the gel-forming material within the batter react to form an additional gel structure.

---

The present invention relates generally to an improved method of applying comestible coatings to food products. More particularly, the present invention is concerned with a novel method of applying more adherent and continuous coating compositions to fried and baked food products.

It is conventional in the frying of food stuffs, such as meat, fish, fruit or vegetables, by deep fat frying or by frying in shallow oil, to preliminarily coat the food stuff with a batter and a breading material. The procedure usually involves the initial coating of the food stuff with a liquid batter, followed by the application of a particulate farinaceous material or breading to the batter-covered surface. The coated product is then either fried, or frozen and stored to be fried at a later date.

The above-described coating compositions, as well as the methods of applying them, suffer from numerous disadvantages. In particular, the loss of batter and breading from the surface of the food product is an accepted fact in the food industry. These losses result in the build up of breading and coating particles in fryers and necessitate the use of frying fat filters and the frequent cleaning of fryers. Even when such procedures are employed, the presence of food particles in the frying fat accelerates the rate of frying fat breakdown and contributes to the production of undesirable color and flavor in the final fried product. In addition, the lack of adhesion between the coating and the food product subsequent to frying results in further coating losses during packaging and package handling, thereby causing unsightly bare spots on the food product reaching the consumer. The use of more expensive packaging materials and handling techniques does not adequately alleviate the problem.

It is an object of the present invention to provide a novel method for applying comestible coatings to food products.

It is another object of the present invention to provide novel methods of applying batter and bread coatings, as well as combinations thereof, to a food substrate which coatings are continuous and adherent and may be subjected to further handling without significant loss of coating.

The above, as well as other objects, features and advantages of the invention are accomplished by a novel method which enhances the adhesion of comestible coatings to the underlying food substrate and, which in addition, produces a stronger continuous coating which is less susceptible to breaking and falling off during subsequent handling. Specifically, it has now been discovered that a wide variety of both batter and breading compositions, as well as combinations thereof, may be formulated and applied to a food substrate by a method involving the use of selected gel-forming materials and gelation agents in combination with conventional batter and bread coatings.

In accordance with the present invention a food substrate, of any desired shape or configuration, is treated with a solution of a gel-forming material which is capable of forming a gel-like skin upon exposure to selected gelation agents. The treated food substrate is then contacted with a setting solution containing the gelation agent to form a skin around the food substrate. Thereafter, a batter mix containing additional amounts of said gel-forming material is applied over the gel-like skin which is still wet with gelatin agent. The food product, coated as described above, may then be subjected to further processing such as frying, baking or the like to stabilize the coating or may be frozen and stored for later processing. Alternatively, the batter coated food product may be further coated with bread particles, or with additional amounts of batter powder, water or dilute batter solution in order to build up the coating. The resulting product, subsequent to frying or baking, will have a continuous coating which is adherent to the food substrate and which possesses the desirable crisp texture and eating characteristics.

While not wishing to be limited to any particular theory, it is presently believed that the gel structure formed by exposing the first coating of the gel-forming material to the gelation agent, not only provides a basic layer which is adherent to the underlying food substrate, but also, due to the presence of the gelation agent on its surface, forms a continuing gel network with the gel-forming material contained in the batter. It is this secondary gel, the formation of which is critically dependent upon the presence of the gelation agent on the surface of the underlying gel skin which provides the enhanced surface continuity of the batter or breaded coatings.

The novel method of the present invention may be employed to coat any of the wide variety of food products which normally have batter or bread coatings. Thus, for example, the method disclosed herein is applicable to the formation of coated vegetable, meat, poultry and fish products.

In general, the gel-forming material contemplated for use in the present invention is selected from a class of materials which form viscous colloidal solutions in water but, when treated with a gelation agent, form a relatively impervious gel-like structure. These materials are further characterized by their heat irreversibility after treatment, i.e., they remain intact as a gel-like skin even when subjected to frying or baking temperatures. Included within this class are such materials as casein, algins, alginates, and carragheenans. Particularly preferred materials for use in the present invention are alginate salts such as sodium alginate.

The gel-forming materials are converted to a heat irreversible gel structure by contact with a gelation agent or a setting solution which provides a source of alkaline earth metal ions, such as magnesium and preferably calcium ions. A wide variety of salts may be employed as the source of alkaline earth ions. Typical salts include calcium or magnesium chlorides, carbonates, lactates and phosphates. However, any other alkaline earth salts which will provide a source of the metal ion may be employed.

The amounts and concentrations of the gel-forming materials and setting solution employed to form the coatings are not critical and may be selected based upon the size of the underlying food substrate and the desired amount and depth of gel structure formation. The rate amount and depth of the gel structure may be further adjusted and controlled by the use of sequestering agents, gel inhibitors, controlling the pH of the solutions used and other gel modification techniques which are well known in the art. Ordinarily, the concentration of the polyvalent alkaline earth salt employed in the first gel-skin forming step will be in the range of 0.2 to 5.0 wt. percent of the setting solution, preferably 1.5 to 2.0 wt. percent, the remainder being water. The concentration of the gel-forming material employed in the batter will be in the range of 0.1 to 2.0 wt. percent, preferably 0.2 to 1.0 wt. percent.

The type of batter and breaders employed are not critical features of the invention. The fluid batter mix or dry batter powders employed in the practice of the invention are conventional except for the presence of the gel-forming material and normally include one or more sources of starch, sugar, salt, leavening, crisping and browning agents and the like, and water. Similarly, the breading materials may be selected from bread crumbs, cracker meal, muffin crumbs, cornflake crumbs or any conventional crumb source normally employed in forming bread-type coatings.

In the preferred embodiment of the invention, the method described herein is employed to coat food products in which the basic food substrate is formed by an extrusion process which includes the formation of a gel-skin on the outer surface of the extruded food product. Such products, as well as methods and apparatus for their preparation, are described in copending, commonly assigned application Ser. No. 839,173, filed in the name of Yechiel Smadar et al. on July 7, 1969 and entitled "Method And Apparatus for Preparing Food Products" and application Ser. No. 839,191, filed July 7, 1969 in the name of Yechiel Smadar and entitled "Extruded Food Product And Method." In accordance with those disclosures, a natural food material such as fruit, vegetable, meat, poultry, fish or dairy products or mixtures thereof are converted to a finely divided mass and are mixed with a gel-forming material to form an extrudable slurry. The slurry may additionally contain other edible ingredients including binders such as flour and water; gelatinous materials; starches, carbohydrates; cornmeals; flavor enhancers; sweeteners; coloring agents and preservatives.

The above described slurry is extruded into an elemental shape, which in many instances will be toroidal, while exposing only the surfaces thereof to wash with a setting solution containing a gelation agent comprising a source of alkaline earth metal ions. The wash causes the formation of an outer gel-like skin on the surface of the extruded shape which continuously grows during continued extrusion and retains the shape of the ungelled food slurry as the extruded product increases in volume. Upon completion of the extrusion, the extruded food product is immersed in a bath containing additional amounts of the gelation agent which serve to build up the outer skin and to insure that the skin completely envelops the extruded ungelled food slurry contained within the skin.

The extruded food products, prepared as described above, may be readily coated with a continuous and adherent coating in accordance with the method of this invention. Thus, the above described extrusion product which already has both the gel-skin and a surface treated with the gelatin agent may be directly coated with a fluid batter containing an alginate or other gel-forming material and thereafter either fried to produce a food product having a continuous and adherent coating or subjected to additional intermediate coating and breading steps as heretofore described before completing the processing to obtain the adherent coating.

The invention will be further understood by reference to the following illustrative examples:

EXAMPLE 1

A piece of chicken is dipped into a 10% aqueous sodium aglinate solution so that the food pieces is thoroughly coated with the solution. Thereafter, the coated food piece is dipped into a 1% solution of calcium chloride and a thin gel skin is formed on the surface of the chicken.

The chicken having the gel-like skin is conveyed through a conventional puff batter mix including 60% wheat flour, 20% corn flour, 10% sugar, 3.6% salt, 1.3% sodium bicarbonate, 1.8% sodium acid pyrophosphate, 2.8% nonfat dry milk and 0.5% dried whole egg, 50 parts of which is mixed with 100 parts of water and 1.5 parts of sodium alginate.

The batter coated food piece is conveyed beneath a conventional breader station where one side of the piece is coated with bread crumbs and then beneath a second breader station where the other side of the piece is breaded.

Upon completion of the breading procedure, the coated chicken piece is cooked by frying at a temperature of 375° for a period of one minute. Examination of the fried food piece reveals that it has a continuous coating which is in intimate contact with the chicken and securely adhered thereto.

EXAMPLE 2

Eight pounds of diced fresh onions are mixed with 1.1 pounds of wheat flour, 0.23 pound of salt, 0.44 pound of sugar and 0.23 pound of a 10% aqueous sodium alginate solution. The ingredients are thoroughly mixed to form a slurry and are fed to an extrusion apparatus provided with a nozzle adapted to extrude toroidal shapes. As each ring is formed and cut at the nozzle of the extrusion apparatus, its outer surfaces are washed with a solution of calcium chloride. The washing action causes the formation of a gel-like skin on the surface of the ring.

The rings having the gel-skin are dropped into the batter bath described in Example 1 and are thereafter breaded and fried as previously described in Example 1.

Examination of the finished product reveals a stabilized inner core of the cooked food product having a breaded coating in intimate contact with and securely adhered to its outer surface.

It will be readily apparent that a wide variety of improvements and modifications can be made to the method without departing from the scope of the invention. For example, where thicker coatings are desired, the coating procedure described herein may be repeated by subjecting the food substrate to successive treatments with setting solutions and alginate containing batter and breading materials. Moreover, in lieu of conveying the food substrate through baths containing the various materials described herein, it will readily occur to those persons skilled in the art that a wide variety of conventional dipping, spraying and related equipment may be used in the practice of the invention.

Having thus described the general nature as well as specific embodiments of the invention, the true scope will now be pointed out in the appended claims.

What is claimed is:

1. A method of forming a continuous adherent comestible coating on a food piece comprising the steps of providing a gel-forming material at the surface of said food piece, said gel-forming material being settable to form a skin upon exposure to a gelation agent, exposing said gel-forming material to a gelation agent in an amount sufficient to form a substantially continuous skin enveloping said food piece and to leave a residue of said gelation agent on the surface of said skin and coating said skin-enveloped food piece with a fluid batter containing a gel-forming material whereby said gelation agent contacts the gel-forming material in said batter and forms an additional gel structure.

2. The method of claim 1 wherein said skin forms a continuing gel network with said additional gel structure.

3. A method in accordance with claim 1 wherein said batter coated food piece is subjected to further processing to stabilize said coating.

4. The method of claim 1 wherein said batter coated food piece is further coated with a breading material.

5. The method of claim 1 wherein said gel-forming material is an alginate.

6. The method of claim 1 wherein said gelation agent is a source of alkaline earth ions.

7. The method of claim 1 wherein said batter coated food piece is coated with additional layers of batter.

8. A method of preparing a food product comprising forming a slurry including comminuted food particles, extruding said slurry into an elemental shape, providing a gel-forming material at the surface of the said extruded slurry, said gel-forming material being settable to form a skin on exposure to a gelation agent, exposing said gel-forming material to a gelation agent for a time and in an amount sufficient to form a substantially continuous skin enveloping said extruded slurry and to leave a residue of said gelation agent on the surface of said skin and coating said skin-enveloped extruded slurry with a fluid batter containing a gel-forming material whereby said gelation agent contacts the gel-forming material in said batter and forms a gel structure in intimate contact with said skin.

9. The method of claim 8 wherein said batter coated extrusion is cooked for a time sufficient to stabilize said flowable slurry and said batter coating.

10. The method of claim 8 wherein said batter coated food piece is further coated with a breading material.

11. The method of claim 8 wherein said batter coated food piece is coated with additional layers of batter.

References Cited

UNITED STATES PATENTS

| | | | |
|---|---|---|---|
| 3,395,024 | 7/1968 | Earle | 99—169 |
| 3,255,021 | 6/1966 | Earle et al. | 99—195 |
| 3,078,172 | 2/1963 | Libby | 99—100 |
| 3,052,545 | 9/1962 | Ducharme et al. | 99—107 |
| 2,992,925 | 7/1961 | Green et al. | 99—100 |
| 2,971,849 | 2/1961 | Keil | 99—166 |
| 2,791,508 | 5/1957 | Rivoche | 99—166 |
| 2,786,764 | 3/1957 | Rivoche | 99—166 |
| 2,611,708 | 9/1952 | Owens et al. | 99—166 |
| 2,517,595 | 8/1950 | Owens et al. | 99—168 |

MORRIS O. WOLK, Primary Examiner

S. B. DAVIS, Assistant Examiner

U.S. Cl. X.R.

99—168, 169

Disclaimer 3,676,158.—*Leonard G. Fischer*, College Point, N.Y. and *Philip Wong*, Bergenfield, N.J. METHOD OF FORMING AN ADHERENT COATING ON FOODS. Patent dated July 11, 1972. Disclaimer filed Mar. 15, 1978, by the assignee, *DCA Food Industries, Inc.*

Hereby enters this disclaimer to claims 1 to 11 of said patent.

[*Official Gazette June 6, 1978.*]